United States Patent
Chen et al.

(10) Patent No.: US 12,075,060 B2
(45) Date of Patent: Aug. 27, 2024

(54) ALTERNATIVE MERGE MODE WITH MOTION VECTOR DIFFERENCE BY USING TEMPLATE-MATCHING

(71) Applicant: Tencent America LLC, Palo Alto, CA (US)

(72) Inventors: Lien-Fei Chen, Hsinchu (TW); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/946,498

(22) Filed: Sep. 16, 2022

(65) Prior Publication Data

US 2023/0109532 A1  Apr. 6, 2023

Related U.S. Application Data

(60) Provisional application No. 63/252,579, filed on Oct. 5, 2021.

(51) Int. Cl.
*H04N 19/105* (2014.01)
*H04N 19/137* (2014.01)
(Continued)

(52) U.S. Cl.
CPC ........ *H04N 19/137* (2014.11); *H04N 19/105* (2014.11); *H04N 19/176* (2014.11); *H04N 19/46* (2014.11); *H04N 19/88* (2014.11)

(58) Field of Classification Search
None
See application file for complete search history.

(56) References Cited

U.S. PATENT DOCUMENTS

2019/0124350 A1  4/2019  Thirumalai et al.
2020/0260102 A1  8/2020  Lin et al.
(Continued)

OTHER PUBLICATIONS

High Efficiency Video Coding, Rec. ITU-T H.265 v4 Dec. 2016, pp. 1-664.

(Continued)

*Primary Examiner* — Christopher G Findley
(74) *Attorney, Agent, or Firm* — ARENTFOX SCHIFF LLP

(57) ABSTRACT

Aspects of the disclosure provide a method, an apparatus, and non-transitory computer-readable storage medium for video decoding. The apparatus includes processing circuitry configured to decode prediction information of a current block in a coded bitstream. The prediction information indicates a merge mode with motion vector difference (MMVD) with a template matching (TM) mode and motion vector difference (MVD) information of the current block. The processing circuitry can determine one or more MVD candidates based on the MVD information. The processing circuitry can perform TM to search for a matched MVD between a current template of the current block and a reference template of a reference block of the current block based on the one or more MVD candidates. The processing circuitry can reconstruct the current block based on a motion vector (MV) that is a summation of a motion vector predictor (MVP) and the matched MVD.

20 Claims, 16 Drawing Sheets

(51) Int. Cl.
*H04N 19/176* (2014.01)
*H04N 19/46* (2014.01)
*H04N 19/88* (2014.01)

(56) References Cited

U.S. PATENT DOCUMENTS

2021/0021841 A1  1/2021  Xu et al.
2023/0094825 A1* 3/2023  Zhang .................... H04N 19/52

OTHER PUBLICATIONS

ITU-T and ISO/IEC, "Versatile Video Coding", ITU-T Rec. H.266 and ISO/IEC 23090-3, 2020, pp. 1-516.
Y.-J. Chang, et al., "Compression efficiency methods beyond VVC", ISO/IEC JTC1/SC29/WG11 JVET-U0100, Jan. 2021, pp. 1-13.
V. Seregin, et al., "Exploration Experiment on Enhanced Compression beyond VVC capability", ISO/IEC JTC1/SC29/WG11 JVET-U2024, Jan. 2021, pp. 1-19.
International Search Report and Written Opinion issued in International Application No. PCT/US2022/076788, mailed Dec. 16, 2022, 10 pages.
Y.-W. Chen, et al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.
Sasaki E et al., "Non-CE9: Harmonization of DMVR and MMVD", 14. JVET Meeting; Mar. 19, 2019-Mar. 27, 2019; Geneva; (The Joint Video Exploration Team of ISO/IEC JTC1/SC29/WG11 and ITU-T SG.16) Document: JVET-N0145_v1, Mar. 19-27, 2019, pp. 1-2.
Supplementary European Search Report and Search Opinion received for European Application No. 22879384.0, mailed on Mar. 21, 2024, 16 pages.
Xiu X et al., "EE2-related: Combination of EE2-3.3, EE2-3.4 and EE2-3.5", 23. JVET Meeting; Jul. 7, 2021-Jul. 16, 2021; Teleconference; (The Joint Video Exploration Team and ITU-T SG. 16) Of ISO/IEC JTC1/SC29/WG11 No. JVET-W0097-v2; m57214, 5 pages.

* cited by examiner

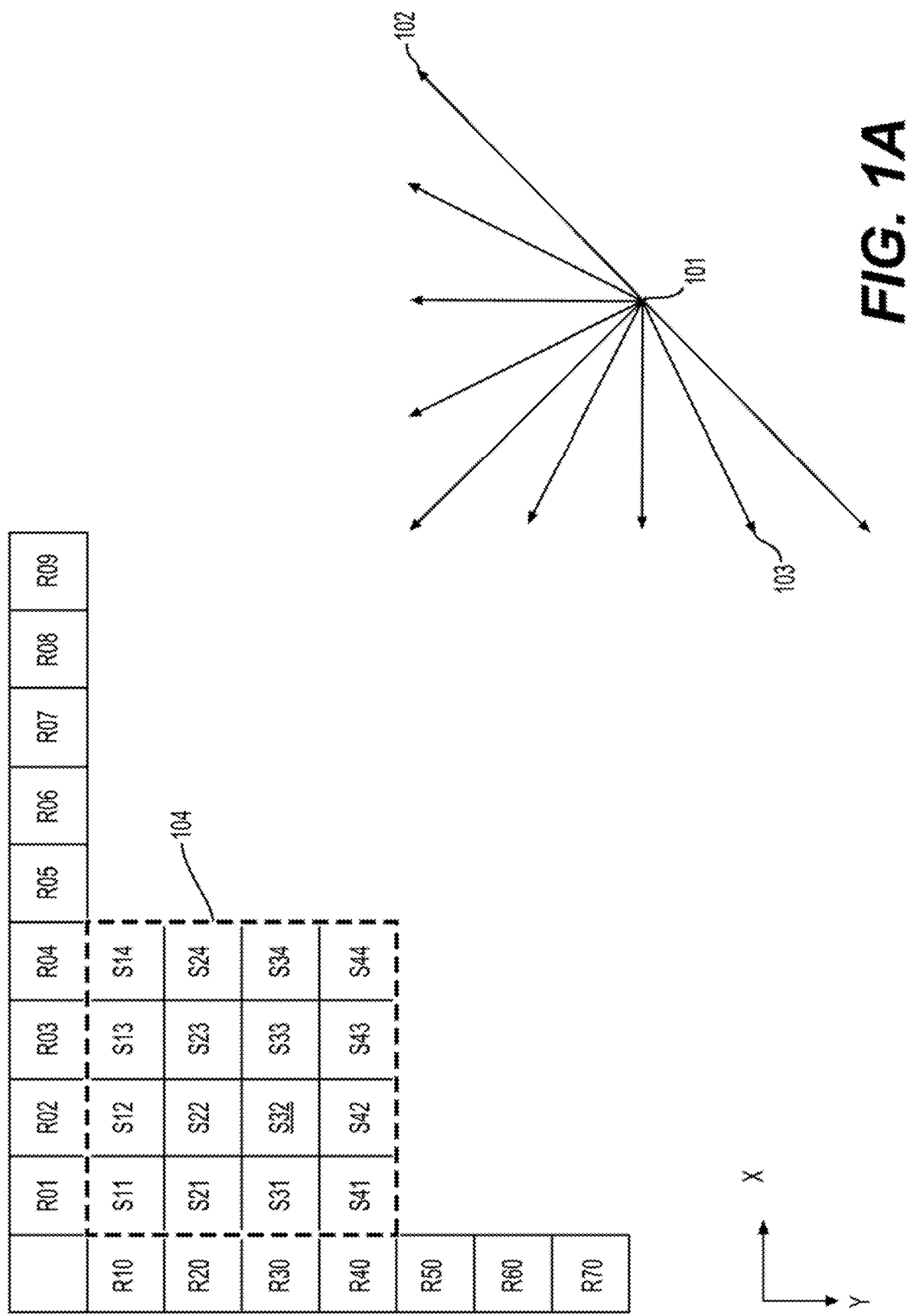

ALTERNATIVE MERGE MODE WITH MOTION VECTOR DIFFERENCE BY USING TEMPLATE-MATCHING

INCORPORATION BY REFERENCE

This present disclosure claims the benefit of priority to U.S. Provisional Application No. 63/252,579, "Alternative Merge Mode with MVD (MMVD) By Using Template-Matching" filed on Oct. 5, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode prediction information of a current block in a coded bitstream. The prediction information can indicate a merge mode with motion vector difference (MMVD) with a template matching (TM) mode and motion vector difference (MVD) information of the current block. The processing circuitry can determine one or more MVD candidates based on the MVD information. The processing circuitry can perform TM to search for a matched MVD between a current template of the current block and a reference template of a reference block of the current block based on the one or more MVD candidates. The processing circuitry reconstruct the current block based on a motion vector (MV) that is a summation of a motion vector predictor (MVP) and the matched MVD.

In an embodiment, the one or more MVD candidates is one MVD candidate. The MVD information includes distance information indicating a magnitude of the one MVD candidate and direction information indicating a direction of the one MVD candidate. The processing circuitry determines the one MVD candidate based on the magnitude of the one MVD candidate and the direction of the one MVD candidate and performs the TM around the one MVD candidate. In an example, the coded bitstream further includes a TM flag, and the TM flag indicates that the TM is enabled for the current block. The distance information includes a distance index pointing to a distance in a plurality of distances where the distance is the magnitude of the one MVD candidate. The plurality of distances is based on a search range of the TM. For example, the search range of the TM is in a range of [−L, +L] in a horizontal direction and in a vertical direction where L is a positive integer. The smallest distance in the plurality of distances can be equal to L or L/2.

In an example, the distance information includes a distance index pointing to a distance in a plurality of distances where the distance is the magnitude of the one MVD candidate. The plurality of distances is in an arithmetic progression.

In an embodiment, the one or more MVD candidates include a plurality of MVD candidates that have a same direction. The MVD information includes direction information indicating the direction of the plurality of MVD candidates. The processing circuitry determines the plurality of MVD candidates based on the direction of the plurality of MVD candidates and a plurality of distances. The plurality of MVD candidates can be ordered based on the plurality of distances. The processing circuitry can apply, for each of the plurality of MVD candidates, the TM to the respective MVD candidate to obtain a TM cost and a corresponding updated MVD candidate corresponding to the respective MVD candidate. The processing circuitry can determine the matched MVD based on the TM costs and the corresponding updated MVD candidates.

In an example, the MVD information includes a distance index. The processing circuitry reorders the plurality of MVD candidates according to the TM costs of the plurality of MVD candidates and determines the matched MVD to be the updated MVD candidate corresponding to the MVD candidate indicated by the distance index in the plurality of reordered MVD candidates.

In an example, the processing circuitry determines the matched MVD to be the updated MVD candidate that corresponds to the smallest TM cost of the TM costs of the plurality of MVD candidates.

In an embodiment, the one or more MVD candidates include a plurality of MVD candidates that have a same magnitude and the MVD information includes distance information indicating the magnitude of the plurality of MVD candidates. The processing circuitry determines the plurality of MVD candidates based on the magnitude of the plurality of MVD candidates and a plurality of directions where the plurality of MVD candidates is ordered according to the plurality of directions. The processing circuitry can apply, for each of the plurality of MVD candidates, the TM to the respective MVD candidate to obtain a TM cost and a corresponding updated MVD candidate corresponding to the respective MVD candidate. The processing circuitry can determine the matched MVD based on the TM costs and the corresponding updated MVD candidates.

In an example, the MVD information includes a direction index. The processing circuitry reorders the plurality of MVD candidates according to the TM costs of the plurality of MVD candidates and determines the matched MVD to be the updated MVD candidate corresponding to the MVD candidate indicated by the direction index in the plurality of reordered MVD candidates.

In an example, the processing circuitry determines the matched MVD to be the updated MVD candidate corresponding to the smallest TM cost of the TM costs of the plurality of MVD candidates.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

DETAILED DESCRIPTION OF EMBODIMENTS

Figure 1B:
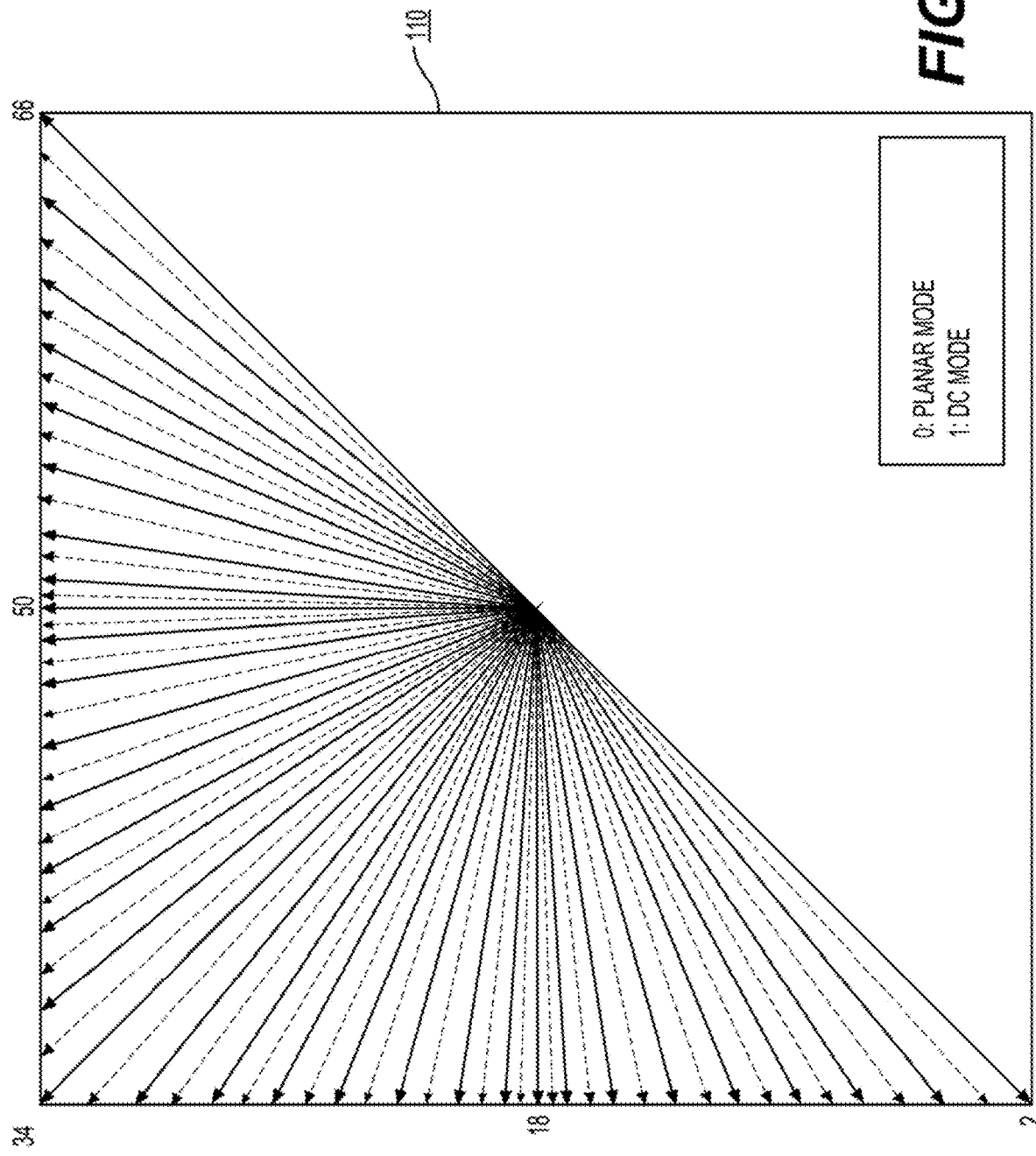
FIG. 1B is an illustration of exemplary intra prediction directions.
Figure 2:
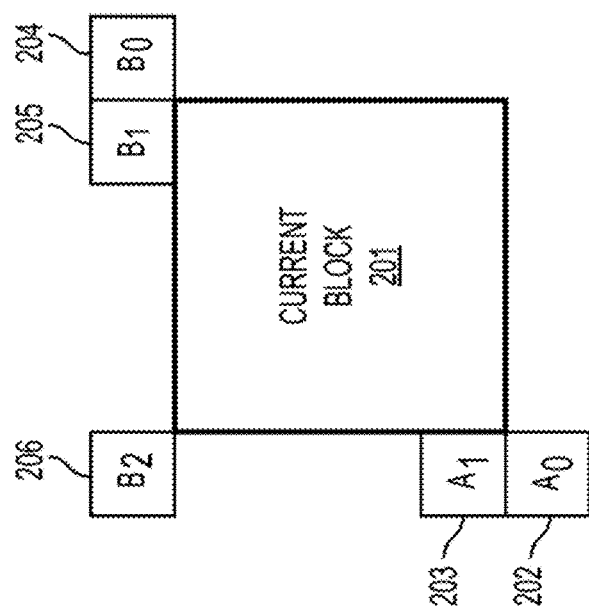
FIG. 2 shows an example of a current block (201) and surrounding samples.
Figure 3:
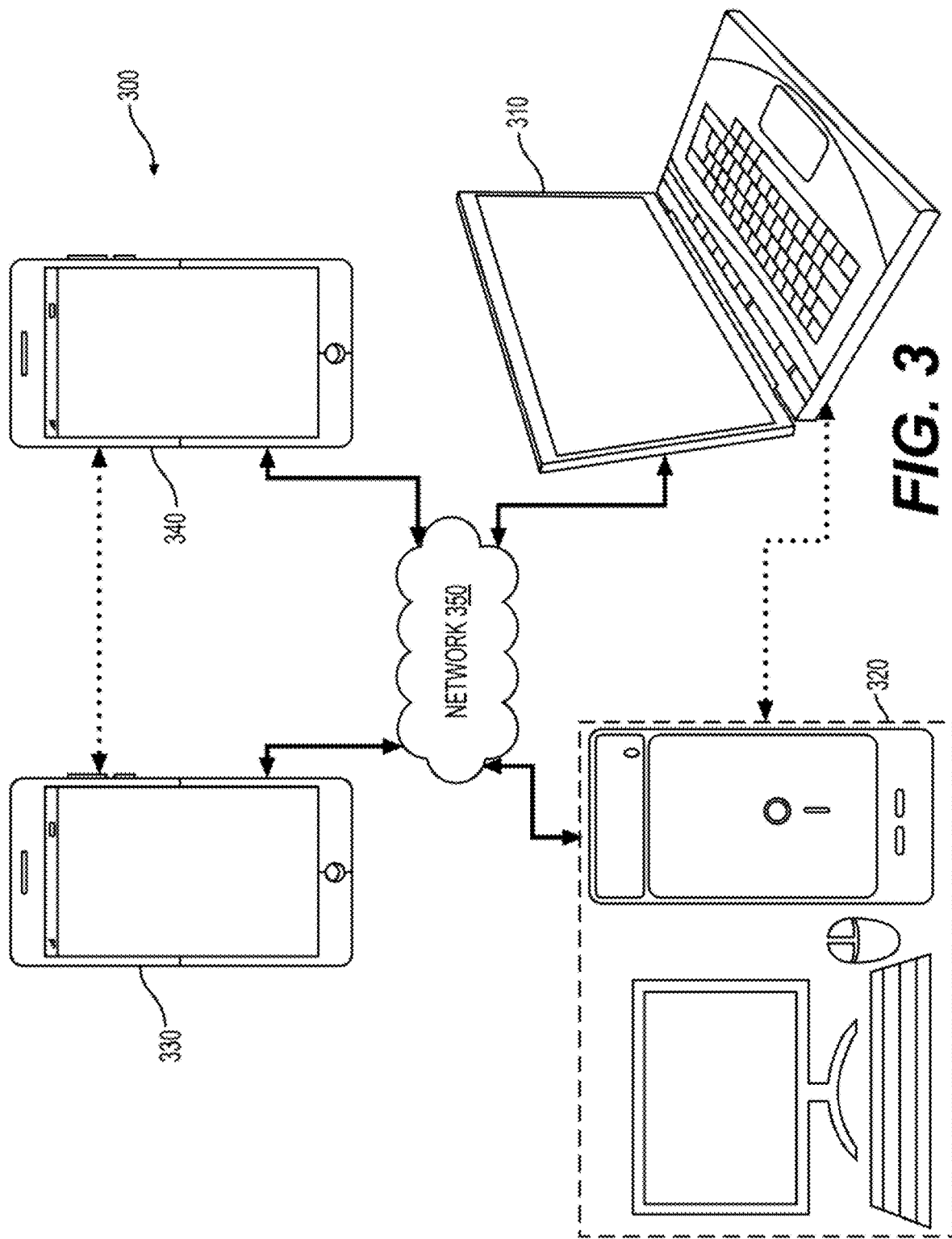
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
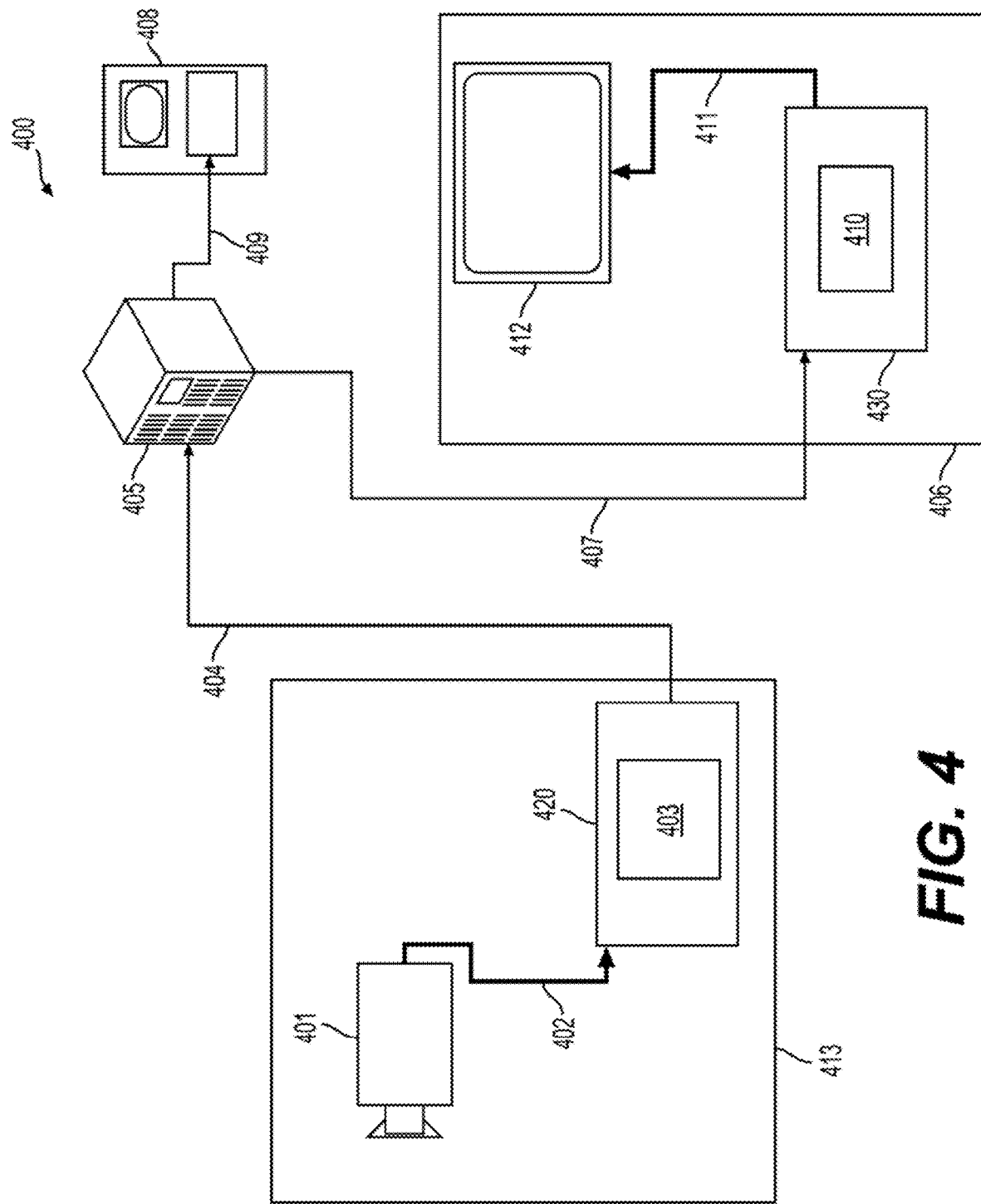
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
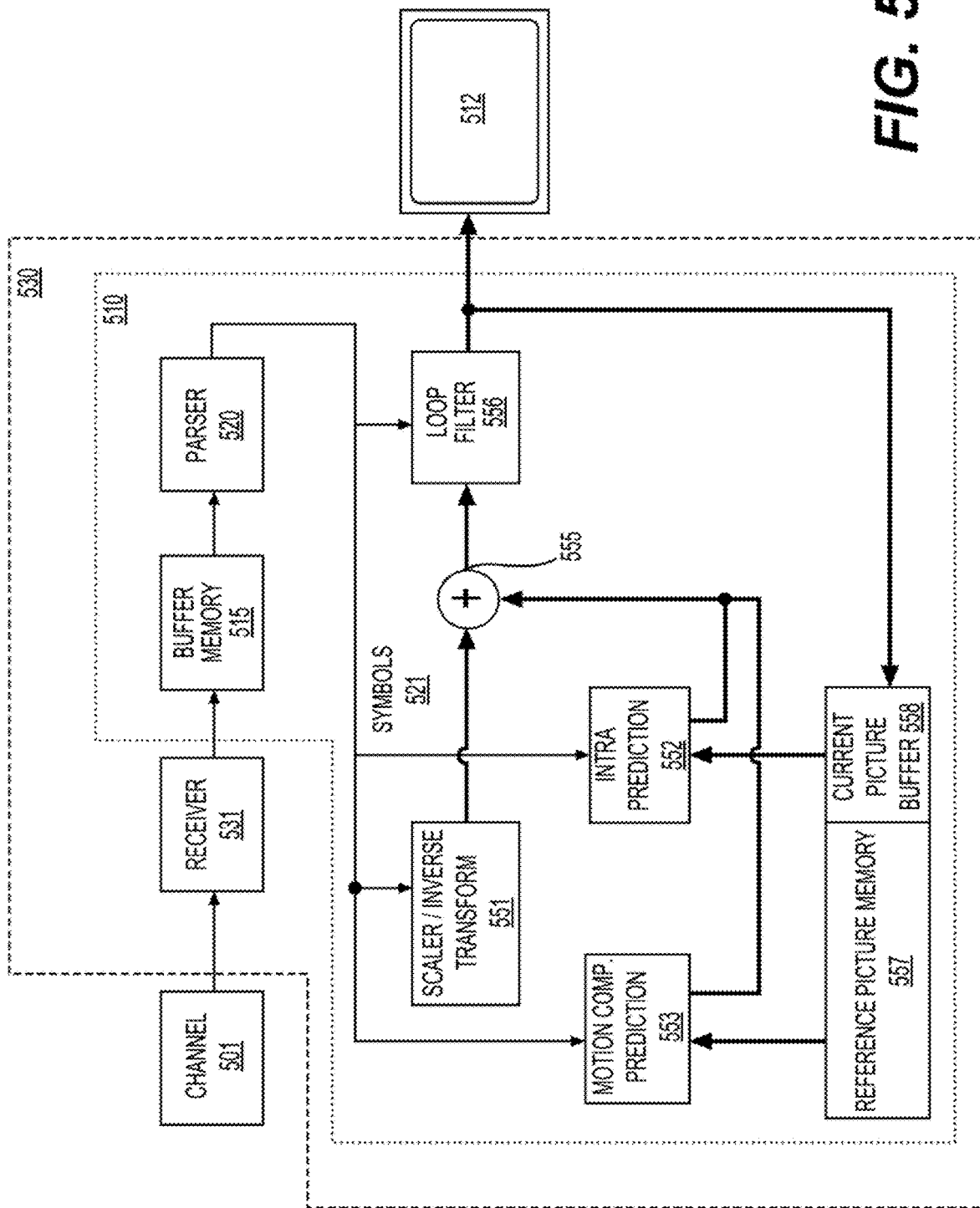
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
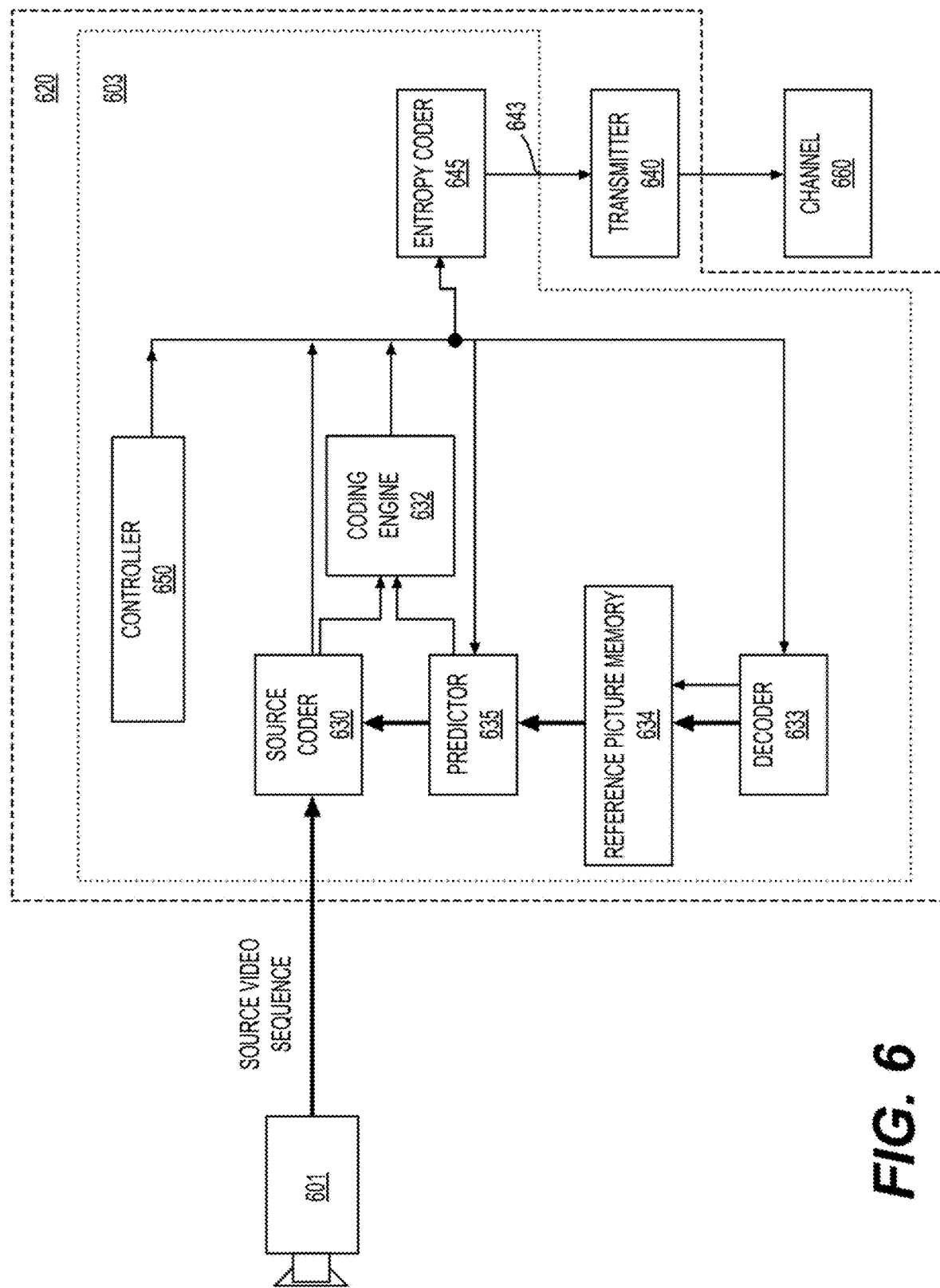
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
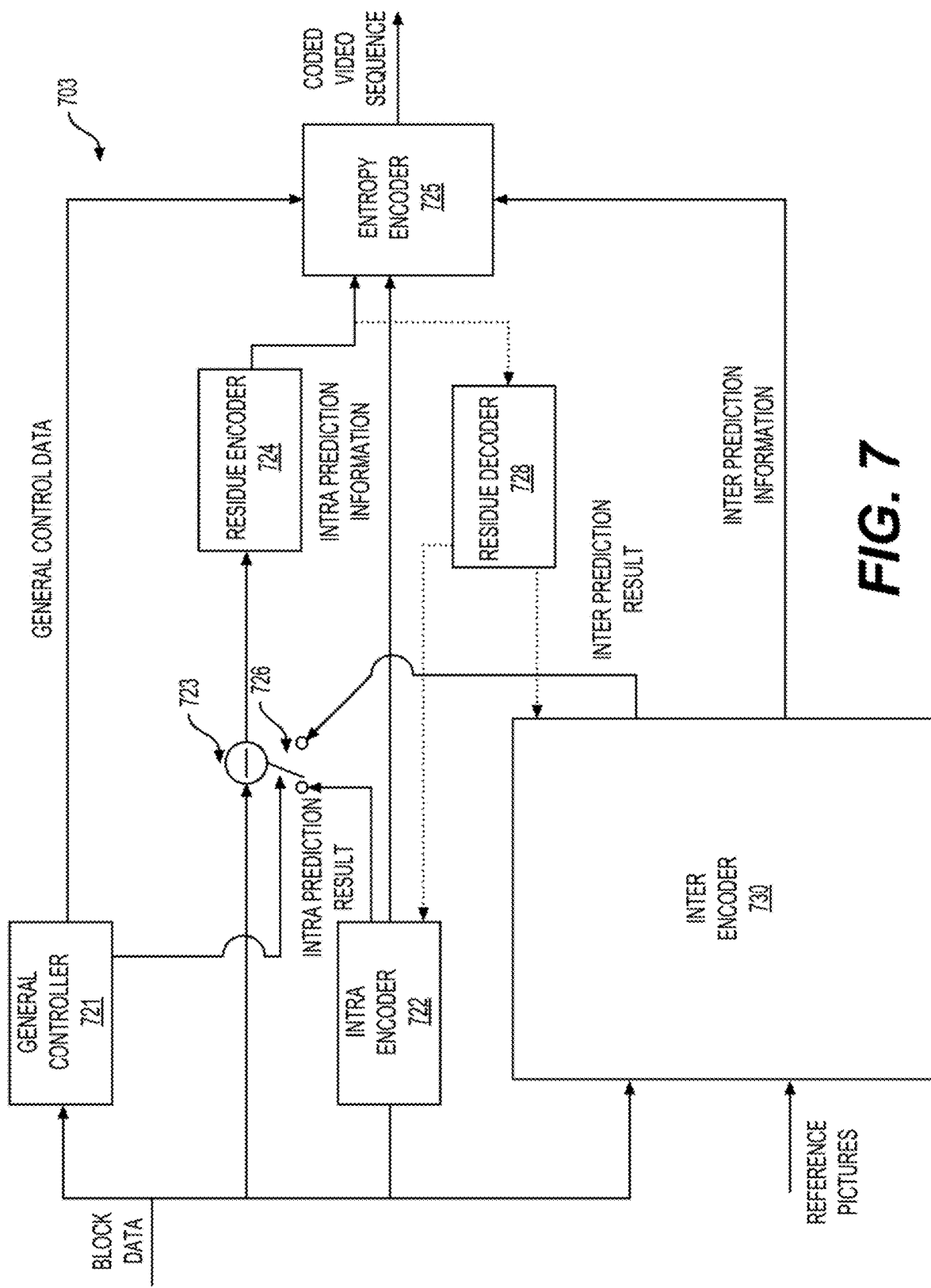
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
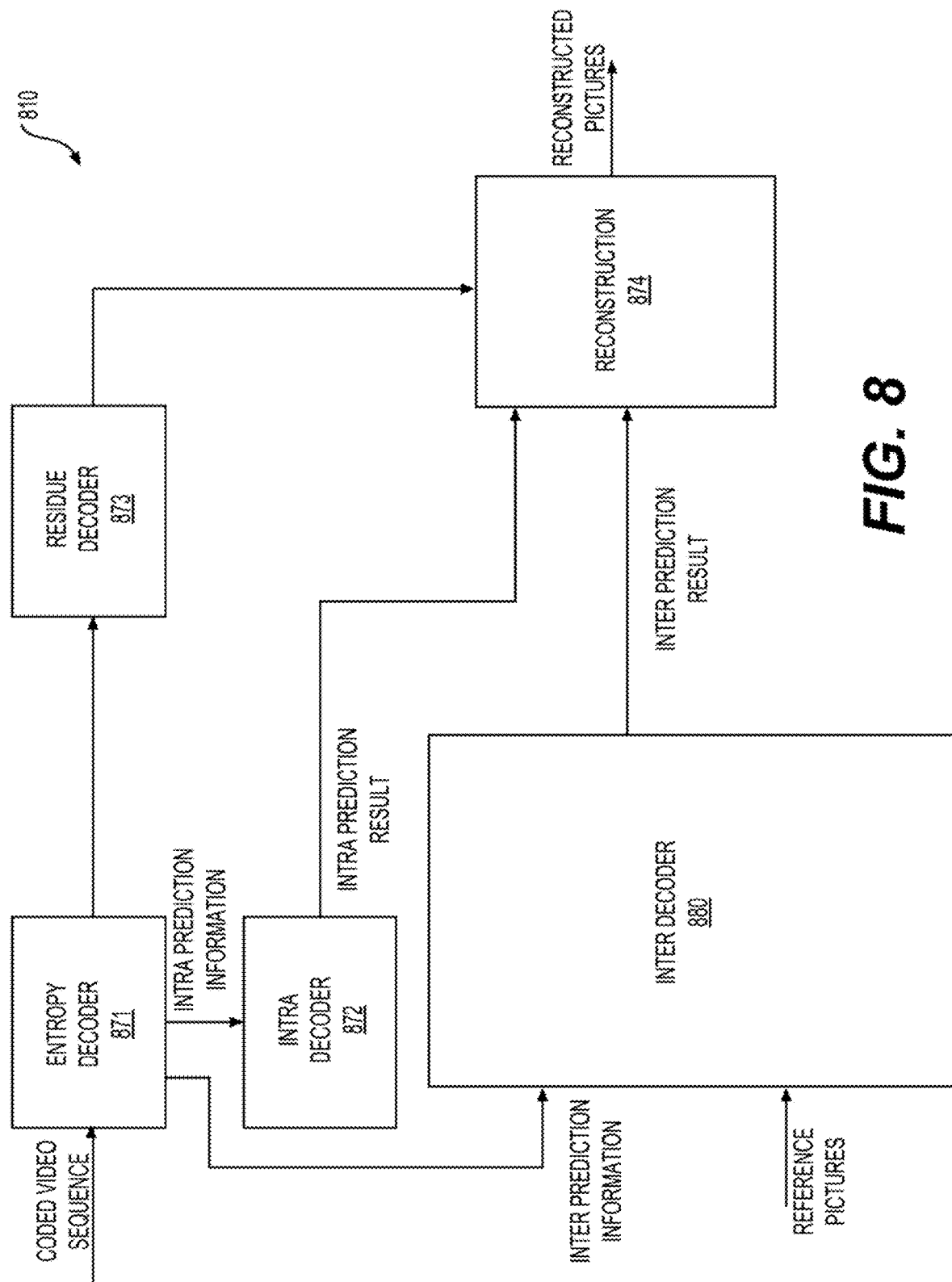
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
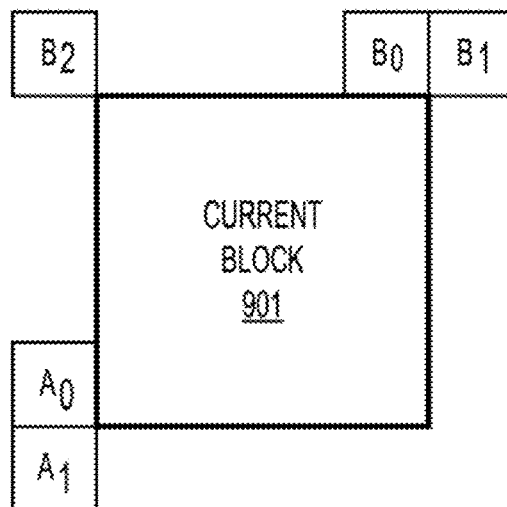
FIG. 9 shows positions of exemplary spatial merge candidates.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g. because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
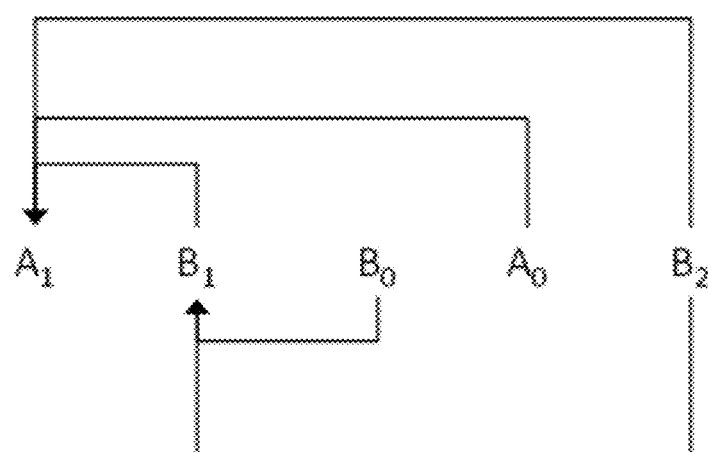
FIG. 10 shows exemplary candidate pairs that are considered for a redundancy check of spatial merge candidates.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
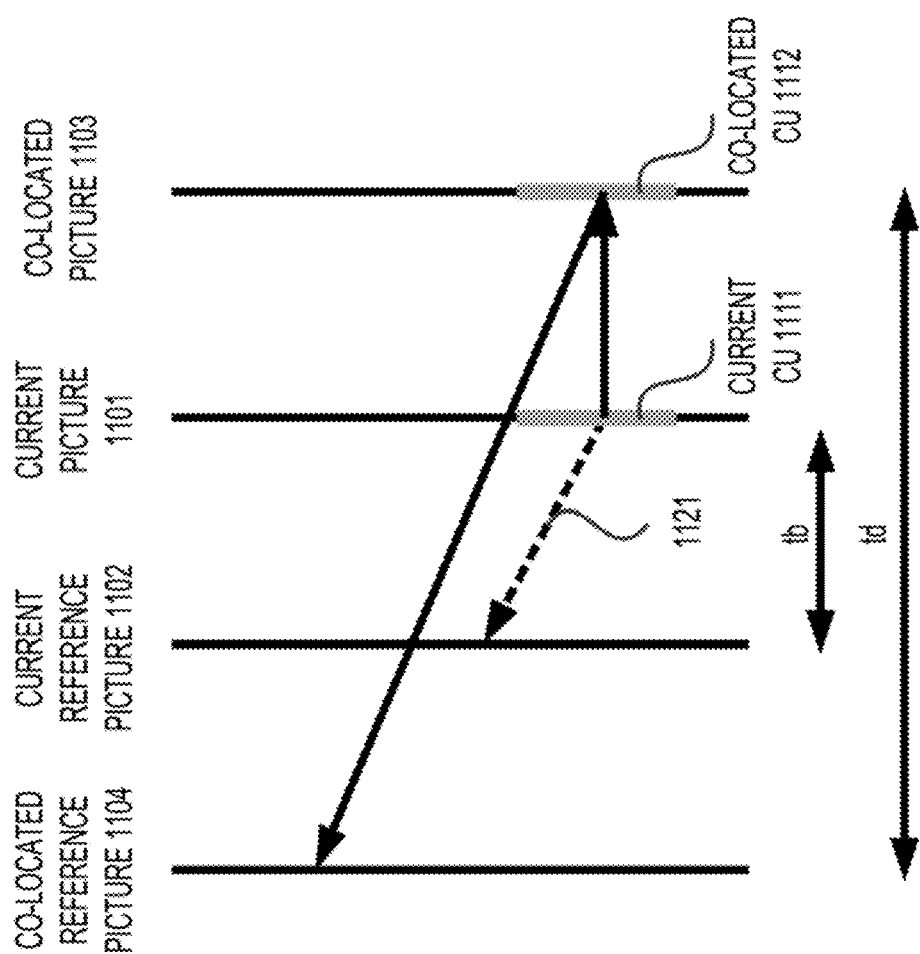
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a collocated reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the co-located reference picture (1104) of the co-located picture (1103) and the co-located picture (1103). A reference picture index of the temporal merge candidate can be set to zero.

Figure 12:
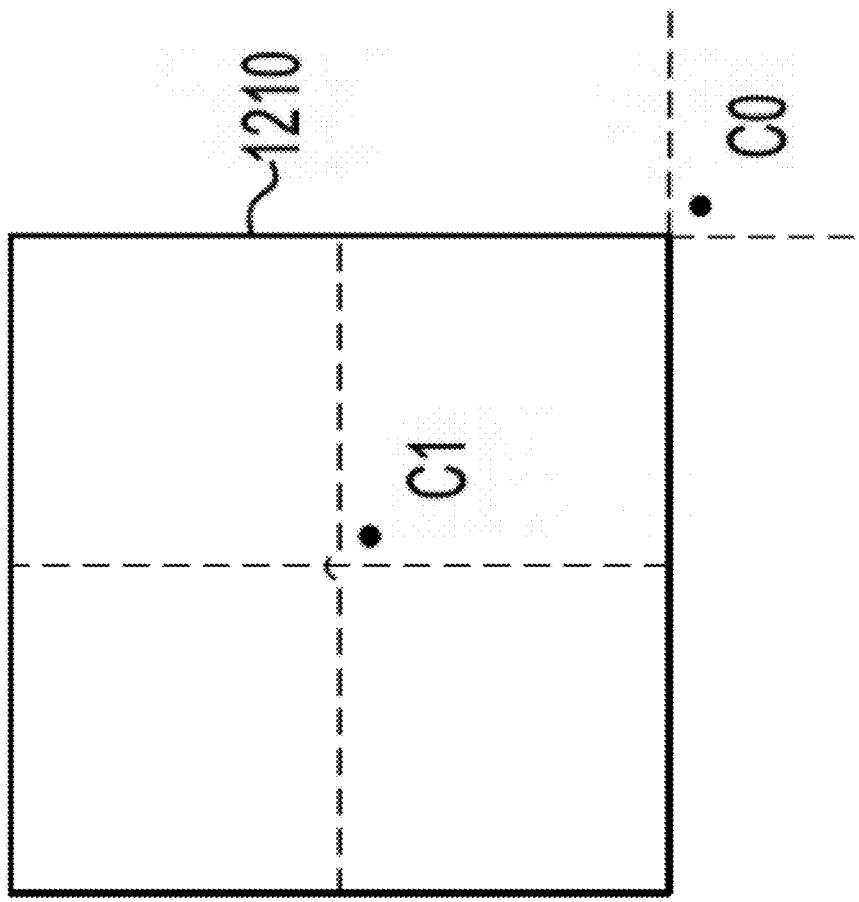
FIG. 12 shows exemplary candidate positions for a temporal merge candidate.

FIG. 12 shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (1210) of the current CU. The candidate position C1 is located at a center of the co-located CU (1210) of the current CU (1210). If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

A merge mode with MVD (MMVD) can be used in video/image coding, such as in VVC. In the MMVD mode, implicitly derived motion information can be used to predict samples of a CU. A MMVD merge flag can be signaled to specify whether the MMVD mode is used for the CU, for example, after signaling a skip flag or a merge flag.

In addition to the merge mode, the MMVD mode can code an MV difference (MVD) such that an MV that is a summation of an MVP and the MVD (or a motion offset) is refined. The MMVD mode can combine the concept of the merge mode and the AMVP mode by providing a predefined MVD as derived merged motion information. In the MMVD mode, one of the first two candidates in the merge candidate list can be selected as a base (also referred to as an MV basis or an MV starting point). For example, a merge candidate flag (e.g., being signaled) indicates the one of the first two candidates in the candidate merge list.

After the MV basis is selected, the MV basis can be refined by additional information, such as signaled MVD information that indicates an MVD to the MV basis. The MVD represented by a direction and a distance can be coded (e.g., encoded) as a refinement of the MV basis. The additional information can include a distance index used to specify the distance (also referred to as a magnitude) of the MVD and a direction index used to indicate the direction of the MVD.

A plurality of distances (also referred to as offsets) (e.g., eight distance entries in each distance set in Table 1) can be designed for the MVD. Table 1 shows two exemplary sets of distances including a first distance set and a second distance set, and shows an exemplary relationship of distance indices and a plurality of distances in each of the distance sets. The first distance set can be used when a full-pel MMVD is off, and a range of MMVD pre-defined offsets can be from ¼ luma samples to 32 luma samples. When the full-pel MMVD is off, a pre-defined offset can have a non-integer value, such as a fraction of a luma sample (e.g., ¼ pixel or ½ pixel). The second distance set can be used when the full-pel MMVD is on, and a range of MMVD pre-defined offsets can be from 1 luma sample to 128 luma samples. In an example, when the full-pel MMVD is on, a pre-defined offset only has an integer value, such as one or more luma samples.

An encoder can select a distance set from Table 1, for example, at a picture level. A distance index can be signaled for an MVD to indicate which distance of the plurality of distances in the selected distance set is applied.

TABLE 1

Exemplary relationships of distance indices and a plurality of distances (in units of luma samples) in an MMVD mode

| Distance index | $1^{st}$ distance set | $2^{nd}$ distance set |
|---|---|---|
| 0 | ¼ | 1 |
| 1 | ½ | 2 |
| 2 | 1 | 4 |
| 3 | 2 | 8 |
| 4 | 4 | 16 |
| 5 | 8 | 32 |
| 6 | 16 | 64 |
| 7 | 32 | 128 |

In an example, a plurality of directions (e.g., four directions, such as 0°, 90°, 180°, and 270°) is allowed for an MVD. A directional index can be signaled to indicate which one of the plurality of directions (e.g., the four directions) is selected to be the direction of the MVD.

Table 2 shows an exemplary relationship between four directions and direction indices. Referring to Table 2, the direction index 00 indicates a positive direction in the x-axis, the direction index 01 indicates a negative direction in the x-axis, the direction index 10 indicates a positive direction in the y-axis, and the direction index 11 indicates a negative direction in the y-axis.

TABLE 2

An exemplary relationship between a direction of an MVD and a direction index

| Direction index | 00 | 01 | 10 | 11 |
|---|---|---|---|---|
| x-axis | + | − | N/A | N/A |
| y-axis | N/A | N/A | + | − |

A template matching (TM) technique can be used in video/image coding. To further improve the compression efficiency of VVC standard, for example, TM can be used to refine an MV. In an example, the TM is used at a decoder side. With the TM mode, an MV can be refined by constructing a template (e.g., a current template) of a block (e.g., a current block) in a current picture to be reconstructed and determine the closest matching between the template of the block in the current picture and a plurality of templates (e.g., a plurality of reference templates) in a reference picture. In an embodiment, the template of the block in the current picture can include left neighboring reconstructed samples of the block and above neighboring reconstructed samples of the block. The TM can be used in video/image coding beyond VVC.

Figure 13:
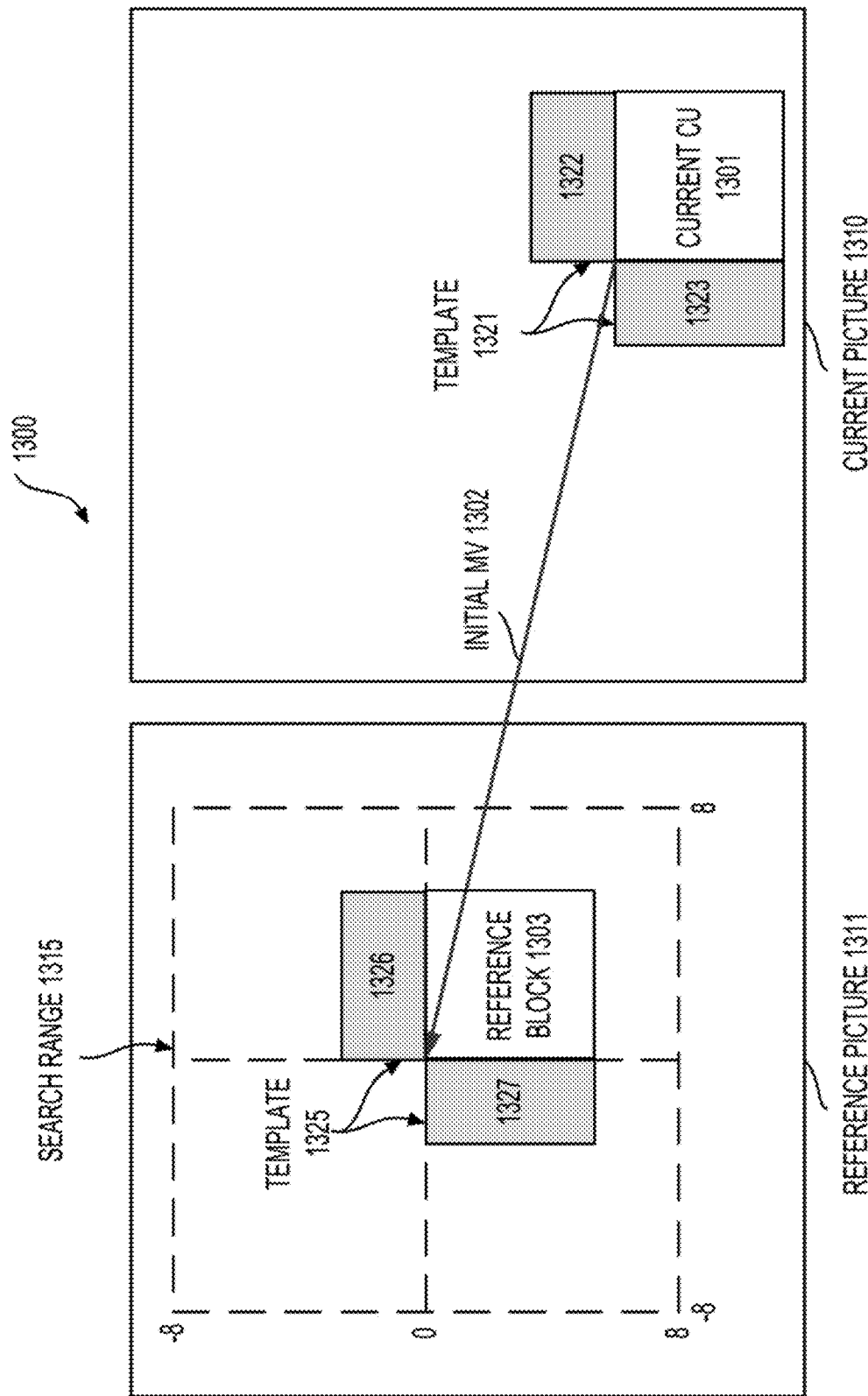
FIG. 13 shows an example of template matching.

FIG. 13 shows an example of template matching (1300). The TM can be used to derive motion information of a current CU (1301) by determining the closest match between a template (1321) of the current CU (1301) in a current picture (1310) and a template in a plurality of templates (e.g., one of the plurality of templates being a template (1325)) in a reference picture (1311). The template (1321) of the current CU (1301) can have any suitable shape and any suitable size.

In an embodiment, the template (1321) of the current CU (1301) includes a top template (1322) and a left template (1323). Each of the top template (1322) and the left template (1323) can have any suitable shape and any suitable size.

The top template (1322) can include samples in one or more top neighboring blocks of the current CU (1301). In an example, the top template (1322) includes four rows of samples in one or more top neighboring blocks of the current CU (1301). The left template (1323) can include samples in one or more left neighboring blocks of the current CU (1301). In an example, the left template (1323) includes four columns of samples in the one or more left neighboring blocks of the current CU (1301).

Each one (e.g., the template (1325)) of the plurality of templates in the reference picture (1311) corresponds to the template (1321) in the current picture (1310). In an embodiment, an initial MV (1302) points from the current CU (1301) to a reference block (1303) in the reference picture (1311). Each one (e.g., the template (1325)) of the plurality of templates in the reference picture (1311) and the template (1321) in the current picture (1310) can have an identical shape and an identical size. For example, the template (1325) includes a top template (1326) in the reference picture (1311) and a left template (1327) in the reference picture (1311). The top template (1326) can include samples in one or more top neighboring blocks of the reference block (1303). The left template (1327) can include samples in one or more left neighboring blocks of the reference block (1303).

A TM cost can be determined based on the template (1321) and the template (1325). The TM cost can indicate matching between the template (1321) and the template (1325). An optimized MV can be determined based on a search around the initial MV (1302) of the current CU (1301) within a search range (1315). The search range (1315) can have any suitable shape and any suitable number of reference samples. In an example, the search range (1315) in the reference picture (1311) includes a [−L, L]-pel range where L is a positive integer, such as 8 (e.g., 8 samples). For example, a difference (e.g., [0, 1]) is determined based on the search range (1315), and an intermediate MV is determined by a summation of the initial MV (1302) and the difference (e.g., [0, 1]). An intermediate reference block and a corresponding template in the reference picture (1311) can be determined based on the intermediate MV. A TM cost can be determined based on the template (1321) and the intermediate template in the reference picture (1311). The TM costs can correspond to the differences (e.g., [0, 0] corresponding to the initial MV (1302), [0, 1], and the like) that are determined based on the search range (1315). In an example, the difference corresponding to the smallest TM cost is selected, and the optimized MV is the summation of the difference corresponding to the smallest TM cost and the initial MV (1302).

The TM can be suitably modified. In an example, a search step size is determined by the AMVR mode. In an example, the TM can be cascaded (e.g., used together) with other coding method(s), such as a bilateral matching process.

In an example, TM is used to refine motion information of an MVP candidate in an AMVP mode and/or a merge candidate in a merge mode.

The disclosure includes aspects related to an MMVD mode in which TM is used to improve the MMVD mode. TM can be utilized to refine MV information of an MVD candidate in an MMVD mode. TM can be utilized to derive direction information (e.g., a direction index) and/or distance information (e.g., a distance index) in the MMVD mode.

In an example, a current block in a current picture is coded with the MMVD mode. An MVP of an MV of the current block may be determined based on a candidate list (e.g., a merge candidate list) and information (e.g., an index or a flag) indicating which one of the candidates (e.g., merge candidates) in the candidate list is used as the MVP. For example, the flag can be a merge candidate flag as described above. One or more parsed MVD candidates can be determined using the MMVD mode, for example, based on MVD information of the current block.

According to an embodiment of the disclosure, the TM is applied together with the MMVD mode to determine an MVD (also referred to as a TM matched MVD) of the MV of the current block. A TM search procedure can be performed around the one or more parsed MVD candidates that are determined in the MMVD mode to determine the TM matched MVD. In an example, a current template of the current block in the current picture and a reference template of a reference block in a reference picture that corresponds to the TM matched MVD has the smallest TM cost (or the closest matching) among template pairs between the current picture and the reference picture (e.g., the current template of the current block in the current picture and reference templates of respective reference blocks in the reference picture). The MV of the current block can be determined based on the MVP and the TM matched MVD, for example, by summing the MVP and the TM matched MVD.

In an embodiment, a single MVD candidate is determined using the MMVD mode. TM is performed around the MVD candidate to determine the TM matched MVD. The single MVD candidate can be determined based on the MVD information of the current block. The MVD information can indicate a distance index and/or a direction index. Any suitable set of distances and/or any suitable set of directions can be used in the MMVD mode. Which distance set and/or which direction set are used to determine the single MVD candidate can be pre-defined or can be indicated in prediction information that includes the MVD information. In an example, the MVD information indicates the first distance set in Table 1 is used, a distance index is 1, and a direction index is 00. Accordingly, the MVD candidate has a magnitude of ½ luma samples and a direction that is identical to the positive x-axis.

In an embodiment, a plurality of MVD candidates is determined using the MMVD mode. TM can be performed around each of the plurality of MVD candidates to obtain a TM cost and a corresponding updated MVD candidate. The TM matched MVD can be determined based on the TM costs and the corresponding updated MVD candidates.

In an embodiment, a TM flag is signaled to indicate whether the TM procedure is enabled or not when the MMVD mode is used. The TM flag may be signaled at a sequence parameter set (SPS) level, a picture parameter set (PPS) level, a picture level (e.g., in a picture header (PH)), a slice level, a block level, or the like. If the TM flag indicates that the TM is enabled with the MMVD mode, the TM can be applied to determine the TM match MVD. Otherwise, if the TM flag indicates that the TM is not enabled with the MMVD mode, no TM is applied to obtain the TM matched MVD.

In an embodiment, a set of distances used in the MMVD mode depends on whether the TM is enabled for the current block. For example, when the TM flag indicates that the TM procedure is enabled, a set of distances that is different from the first set of distances and the second set of distances shown in Table 1 is used in the MMVD mode.

In an example, when TM is enabled for MMVD mode, the set of distances that is available for MVD candidate(s) in the MMVD mode starts from a larger distance, such as 4 luma samples instead of ¼ luma samples in the first set of distances or 1 luma sample in the second set of distances. The set of distances can depend on a search range of the TM. In an example, the search range of the TM mode is in a range of [−L, +L] in a horizontal direction and in a vertical direction where L is a positive number. Referring back to FIG. 13, the search range is [−8, 8] when L is 8. The smallest distance in the set of distances can depend on the search range of the TM procedure in the MMVD mode. In an example, the smallest distance in the set of distances corresponds to a distance index being 0. When the distance value (e.g., the smallest distance) of the distance index 0 is changed, the set of distances is changed accordingly. Table 3 shows an exemplary relationship of distance indices and a plurality of distances (in units of luma samples) in the MMVD mode.

TABLE 3

An exemplary relationship of distance indices and a plurality of distances (in units of luma samples) in an MMVD mode

| Distance index | Distance set |
| --- | --- |
| 0 | 4 |
| 1 | 8 |
| 2 | 16 |
| 3 | 32 |
| 4 | 64 |
| 5 | 128 |
| 6 | 256 |
| 7 | 512 |

In an example, the distance value (e.g., the smallest distance in the set of distances) corresponding to the distance index 0 is equal to L where the search range of the TM procedure in the MMVD mode is the range of [−L, +L]. For example, the distance value is 8 luma samples when the TM search range is in the range of [−8, +8]-pel.

In an example, the distance value (e.g., the smallest distance in the set of distances) corresponding to the distance index 0 is a fraction of L, such as equal to L/2, where the search range of the TM procedure in the MMVD mode is the range of [−L, +L]. For example, the distance value is 4 luma samples when the TM search range is in the range of [−8, +8]-pel.

In an example, distance values in a set of distances are in an arithmetic progression. For example, the distance values are 8, 16, 24, 32, 40, 48, 56, and 64 corresponding to distances indices 0-7, respectively. In another example, the distance values are 4, 12, 20, 28, 36, 44, 52, and 60 corresponding to distances indices 0-7, respectively.

As described above, any suitable set of distances can be used in the MMVD mode. A set of distances used in the MMVD mode can include any suitable number of distances and/or any suitable distances values.

As described above, a plurality of MVD candidates can be determined using the MMVD mode. TM can be performed around each of the plurality of MVD candidates to obtain a TM cost and a corresponding updated MVD candidate. The TM matched MVD can be determined based on the TM costs and the corresponding updated MVD candidates.

In an embodiment, one or more direction indices, a distance step, and/or one or more distance indices can be derived or ranked (e.g., reordered) based on TM cost(s).

In an embodiment, the plurality of MVD candidates has a same direction. The direction of the plurality of MVD candidates can be parsed in the MMVD mode. For example, the MVD information indicates the direction of the plurality of MVD candidates (e.g., via a direction index). Magnitudes (or distances) of the plurality of MVD candidates can be determined based on a set of distances, such as shown in Tables 1 and 3. In an example, the magnitudes of the plurality of MVD candidates are the distances in the set of distances, respectively. After parsing the direction, the TM procedure can be applied to the plurality of MVD candidates that is along the parsed direction to determine corresponding TM costs and respective updated MVD candidates. The search range of the TM procedure can be any suitable search range, such as within the range of [−L, L], as described above. A search step size can be any suitable step size. In an example, the search range is limited to certain direction(s), such as the parsed direction. The plurality of MVD candidates can be ranked (e.g., reordered) based on the TM costs, such as sorted with an ascending order of the TM costs. In an example, the MVD information indicates distance information, such as a distance index. In an example, the distance index is signaled. The TM matched MVD can be determined to be the updated MVD candidate corresponding to the MVD candidate indicated by the distance index in the plurality of reordered MVD candidates. In an example, the distance index is not signaled, and the TM matched MVD is determined to be the updated MVD candidate corresponding to the smallest TM cost in the plurality of reordered MVD candidates.

For example, the direction of the plurality of MVD candidates is the positive x-axis indicated by the direction index of 00. A number of the plurality of MVD candidates is 8. The plurality of MVD candidates has magnitudes 4, 8, 16, 32, 64, 128, 256, and 512 luma samples, respectively as shown in Table 3. Prior to the TM, the relationship between distance indices and the corresponding distances is indicated by Table 3, for example, the distance index 0 corresponds to the distance value of 4 luma samples. The TM procedure is applied to each of the plurality of MVD candidates to determine a TM cost and a respective updated MVD candidate, such as shown in Table 4.

TABLE 4

An exemplary relationship of the plurality of MVD candidates, the TM costs, and the corresponding updated MVD candidates

| MVD candidates | TM costs | Updated MVD candidates |
| --- | --- | --- |
| Magnitude: 4, direction: +x axis | TM cost 0 | Updated MVD candidate 0 |
| Magnitude: 8, direction: +x axis | TM cost 1 | Updated MVD candidate 1 |
| Magnitude: 16, direction: +x axis | TM cost 2 | Updated MVD candidate 2 |
| Magnitude: 32, direction: +x axis | TM cost 3 | Updated MVD candidate 3 |
| Magnitude: 64, direction: +x axis | TM cost 4 | Updated MVD candidate 4 |
| Magnitude: 128, direction: +x axis | TM cost 5 | Updated MVD candidate 5 |
| Magnitude: 256, direction: +x axis | TM cost 6 | Updated MVD candidate 6 |
| Magnitude: 512, direction: +x axis | TM cost 7 | Updated MVD candidate 7 |

The first column in Table 4 shows the plurality of MVD candidates. The plurality of MVD candidates (e.g., the MVD candidates 0-7) has the same direction: the positive x axis. The magnitudes or the distances of the MVD candidates 0-7 are 4, 8, 16, 32, 64, 128, 256, and 512 luma samples, respectively. The TM costs of the MVD candidates 0-7 are the TM costs 0-7, respectively. The updated MVD candidates of the corresponding MVD candidates 0-7 are the updated MVD candidates 0-7, respectively. A magnitude of an updated MVD candidate (e.g., the updated MVD candidate 0) can be different or identical to a magnitude of a corresponding MVD candidate (e.g., the MVD candidate 0). A direction of an updated MVD candidate (e.g., the updated MVD candidate 0) can be different or identical to a direction of a corresponding MVD candidate (e.g., the MVD candidate 0).

In an example, the TM costs in Table 4 in an ascending order are the TM cost 3, the TM cost 4, the TM cost 6, the TM cost 0, the TM cost 1, the TM cost 2, the TM cost 7, and the TM cost 5. The TM cost 3 is the smallest of the TM costs. Table 5 shows a relationship of the MVD candidates, the updated MVD candidates, and the TM costs that are shown in Table 4. The rows in Table 5 are different from the rows in Table 4. In Table 5, the rows are reordered based on the TM costs.

TABLE 5

The reordered MVD candidates and the updated MVD candidates

| MVD candidates | TM costs | Updated MVD candidates |
|---|---|---|
| Magnitude: 32, direction: +x axis | TM cost 3 | Updated MVD candidate 3 |
| Magnitude: 64, direction: +x axis | TM cost 4 | Updated MVD candidate 4 |
| Magnitude: 256, direction: +x axis | TM cost 6 | Updated MVD candidate 6 |
| Magnitude: 4, direction: +x axis | TM cost 0 | Updated MVD candidate 0 |
| Magnitude: 8, direction: +x axis | TM cost 1 | Updated MVD candidate 1 |
| Magnitude: 16, direction: +x axis | TM cost 2 | Updated MVD candidate 2 |
| Magnitude: 512, direction: +x axis | TM cost 7 | Updated MVD candidate 7 |
| Magnitude: 128, direction: +x axis | TM cost 5 | Updated MVD candidate 5 |

The plurality of MVD candidates can be ranked (e.g., reordered) based on the TM costs, such as sorted with the ascending order of the TM costs. Table 6 shows the ranked (e.g., reordered) MVD candidates based on the TM costs and the corresponding distance indices.

TABLE 6

The reordered MVD candidates

| Distance index | MVD candidates |
|---|---|
| 0 | Magnitude: 32, direction: +x axis |
| 1 | Magnitude: 64, direction: +x axis |
| 2 | Magnitude: 256, direction: +x axis |
| 3 | Magnitude: 4, direction: +x axis |
| 4 | Magnitude: 8, direction: +x axis |
| 5 | Magnitude: 16, direction: +x axis |
| 6 | Magnitude: 512, direction: +x axis |
| 7 | Magnitude: 128, direction: +x axis |

If the distance index is 0, the MVD candidate indicated by the distance index 0 is the candidate with a magnitude of 32 luma samples and a direction of +x axis, such as the first candidate in Table 6. Based on the relationship of the plurality of MVD candidates, the TM costs, and the corresponding updated MVD candidates, such as indicated in Table 4 or Table 5, the updated MVD candidate corresponding to the MVD candidate (e.g., Magnitude: 32, direction: +x axis) is derived to be the updated MVD candidate 3. Accordingly, the TM matched MVD is determined to be the updated MVD candidate 3. Both the MVD candidate (e.g., Magnitude: 32, direction: +x axis) and the updated MVD candidate 3 correspond to the TM cost 3.

In an embodiment, the distance index is not signaled. The direction information (e.g., the direction index) and distance step information (e.g., indicating which set of distances is used in the MMVD mode) are signaled. The TM matched MVD can be determined to be the updated MVD candidate (e.g., the updated MVD candidate 3) that corresponds to the smallest TM cost (e.g., the TM cost 3) of the TM costs of the plurality of MVD candidates. In an example, the plurality of MVD candidates along the parsed direction is ranked (e.g., reordered) based on the corresponding TM costs, as described above. Referring to Table 6, no distance index is signaled. The smallest TM cost is the TM cost 3. The TM cost 3 corresponds to the updated MVD candidate 3, and thus the TM matched MVD is the updated MVD candidate 3.

In an embodiment, the plurality of MVD candidates has a same distance (or magnitude). The distance of the plurality of MVD candidates can be parsed in the MMVD mode. For example, the MVD information indicates the distance of the plurality of MVD candidates (e.g., via a distance index). Directions of the plurality of MVD candidates can be determined based on a set of directions, such as shown in Table 2. In an example, the directions of the plurality of MVD candidates are the four directions shown in Table 2. The TM procedure can be applied to the plurality of MVD candidates to determine corresponding TM costs and respective updated MVD candidates. The search range of the TM procedure can be any suitable search range, such as within the range of [−L, L], as described above. A search step size can be any suitable step size. The plurality of MVD candidates can be ranked (e.g., reordered) based on the TM costs, such as sorted with an ascending order of the TM costs. In an example, the MVD information indicates direction information, such as a direction index. In an example, the direction index is signaled. The TM matched MVD can be determined to be the updated MVD candidate corresponding to the MVD candidate indicated by the direction index in the plurality of reordered MVD candidates.

For example, the distance of the plurality of MVD candidates is 8 luma samples indicated by the distance index of 5 that points to the first distance set in Table 1. A number of the plurality of MVD candidates is 4. The plurality of MVD candidates has directions of +x-axis, −x-axis, +y-axis, and −y-axis, respectively as shown in Table 2. Prior to the TM, the relationship between direction indices and the corresponding directions is indicated by Table 2, for example, the direction index 00 corresponds to the direction of +x-axis. The TM procedure is applied to each of the plurality of MVD candidates to determine a TM cost and a respective updated MVD candidate, such as shown in Table 7.

TABLE 7

An exemplary relationship of the plurality of MVD candidates, the TM costs, and the corresponding updated MVD candidates

| MVD candidates | TM costs | Updated MVD candidates |
|---|---|---|
| Magnitude: 8, direction: +x axis | TM cost A | Updated MVD candidate A |
| Magnitude: 8, direction: −x axis | TM cost B | Updated MVD candidate B |
| Magnitude: 8, direction: +y axis | TM cost C | Updated MVD candidate C |
| Magnitude: 8, direction: −y axis | TM cost D | Updated MVD candidate D |

The first column in Table 7 shows the plurality of MVD candidates. The plurality of MVD candidates (e.g., the MVD candidates A-D) has the same distance: 8 luma samples. The directions of the MVD candidates A-D are +x-axis, −x-axis, +y-axis, and −y-axis, respectively. The TM costs of the MVD candidates A-D are the TM costs A-D, respectively. The updated MVD candidates of the corresponding MVD candidates A-D are the updated MVD candidates A-D, respectively. A magnitude of an updated MVD candidate (e.g., the updated MVD candidate A) can be different or identical to a magnitude of a corresponding MVD candidate (e.g., the MVD candidate A). A direction of an updated MVD candidate (e.g., the updated MVD candidate A) can be different or identical to a direction of a corresponding MVD candidate (e.g., the MVD candidate A).

In an example, the TM costs in Table 7 in an ascending order are the TM cost B, the TM cost C, the TM cost D, and the TM cost A. The TM cost B is the smallest of the TM costs. Table 8 shows a relationship of the MVD candidates, the updated MVD candidates, and the TM costs that are shown in Table 7. The rows in Table 8 are different from the rows in Table 7. In Table 8, the rows are reordered based on the TM costs.

TABLE 8

The reordered MVD candidates and the updated MVD candidates

| MVD candidates | TM costs | Updated MVD candidates |
|---|---|---|
| Magnitude: 8, direction: +x axis | TM cost B | Updated MVD candidate B |
| Magnitude: 8, direction: −x axis | TM cost C | Updated MVD candidate C |
| Magnitude: 8, direction: +y axis | TM cost D | Updated MVD candidate D |
| Magnitude: 8, direction: −y axis | TM cost A | Updated MVD candidate A |

The plurality of MVD candidates can be ranked (e.g., reordered) based on the TM costs, such as sorted with the ascending order of the TM costs. Table 9 shows the ranked (e.g., reordered) MVD candidates based on the TM costs and the corresponding distance indices.

TABLE 9

The reordered MVD candidates

| Distance index | MVD candidates |
|---|---|
| 0 | Magnitude: 8, direction: −x axis |
| 1 | Magnitude: 8, direction: +y axis |
| 2 | Magnitude: 8, direction: −y axis |
| 3 | Magnitude: 8, direction: +x axis |

If the direction index is 0, the MVD candidate indicated by the direction index 0 is the candidate with a magnitude of 8 luma samples and a direction of −x axis, such as the first candidate in Table 9. Based on the relationship of the plurality of MVD candidates, the TM costs, and the corresponding updated MVD candidates, such as indicated in Table 7 or Table 8, the updated MVD candidate corresponding to the MVD candidate (e.g., Magnitude: 8, direction: −x axis) is derived to be the updated MVD candidate B. Accordingly, the TM matched MVD is determined to be the updated MVD candidate B. Both the MVD candidate (e.g., Magnitude: 8, direction: −x axis) and the updated MVD candidate B correspond to the TM cost B.

In an embodiment, the direction index is not signaled. The TM matched MVD can be determined to be the updated MVD candidate (e.g., the updated MVD candidate B) that corresponds to the smallest TM cost (e.g., the TM cost B) of the TM costs of the plurality of MVD candidates. In an example, the plurality of MVD candidates having the same distance is ranked (e.g., reordered) based on the corresponding TM costs, as described above. The smallest TM cost is the TM cost B. The TM cost B corresponds to the updated MVD candidate B, and thus the TM matched MVD is the updated MVD candidate B.

Figure 14:
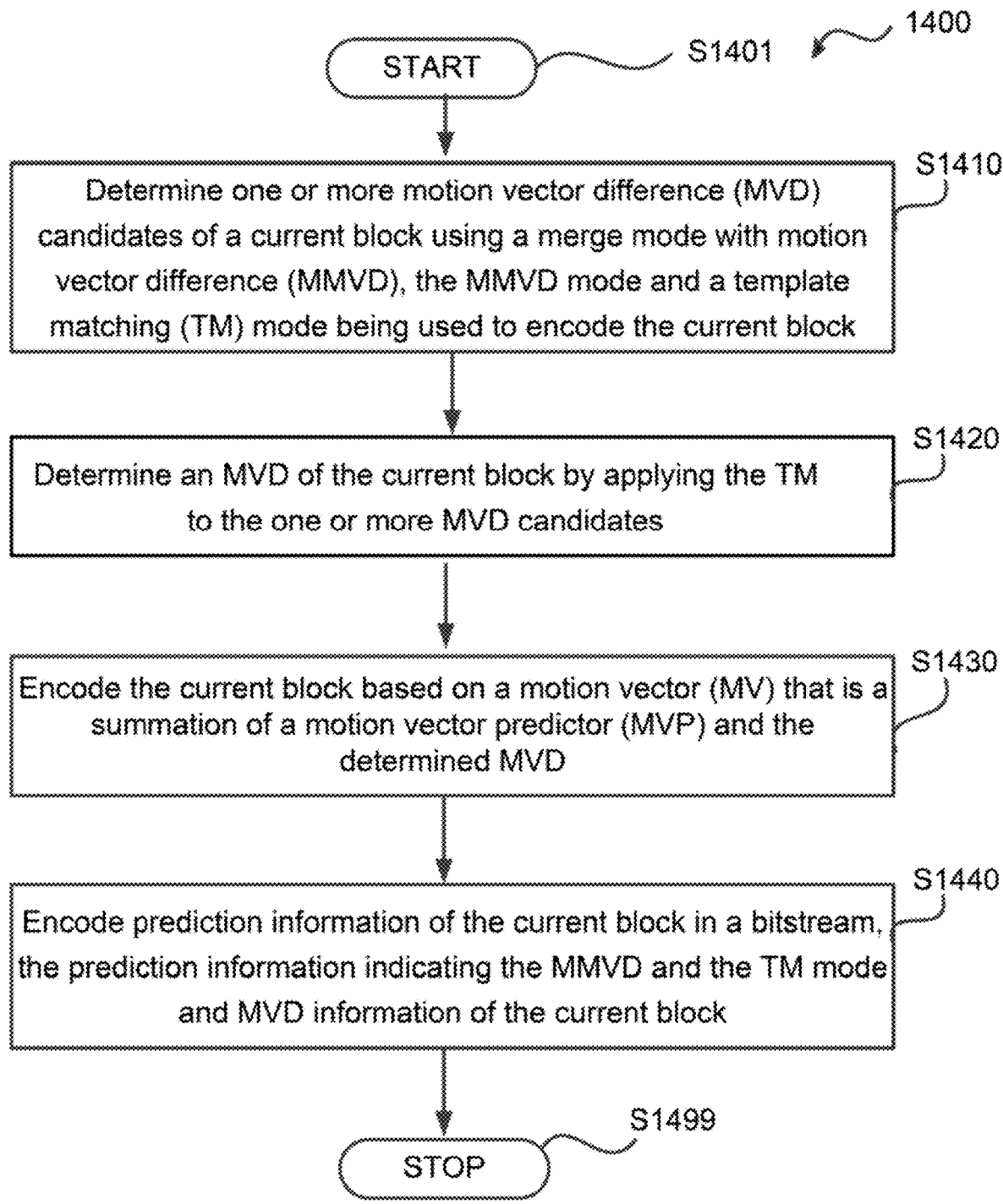
FIG. 14 shows a flow chart outlining an exemplary encoding process.

FIG. 14 shows a flow chart outlining an encoding process (1400) according to an embodiment of the disclosure. In various embodiments, the process (1400) is executed by processing circuitry, such as the processing circuitry in the terminal devices (310), (320), (330) and (340), processing circuitry that performs functions of a video encoder (e.g., (403), (603), (703)), or the like. In some embodiments, the process (1400) is implemented in software instructions, thus when the processing circuitry executes the software instructions, the processing circuitry performs the process (1400). The process starts at (S1401), and proceeds to (S1410).

At (S1410), one or more motion vector difference (MVD) candidates of a current block can be determined using a merge mode with motion vector difference (MMVD). The MMVD mode and a template matching (TM) mode are used together to encode the current block.

At (S1420), an MVD of the current block can be determined by applying the TM to the one or more MVD candidates.

In an embodiment, the one or more MVD candidates is one MVD candidate. The MVD can be determined by applying the TM to the one MVD candidate, as described in the disclosure.

In an embodiment, the one or more MVD candidates include a plurality of MVD candidates that have a same direction. The plurality of MVD candidates can have a plurality of distances, respectively. In an example, the plurality of MVD candidates is ordered based on the plurality of distances. The TM can be applied for each of the plurality of MVD candidates to obtain a TM cost and a respective updated MVD candidate. The MVD can be determined based on the TM costs and the corresponding updated MVD candidates.

In an example, the plurality of MVD candidates is ranked (e.g., reordered) according to the TM costs of the plurality of MVD candidates. The MVD is determined to be an updated MVD candidate based on a corresponding TM cost.

In an example, the MVD is determined to be the updated MVD candidate that corresponds to the smallest TM cost of the TM costs of the plurality of MVD candidates.

In an embodiment, the one or more MVD candidates include a plurality of MVD candidates that have a same magnitude. The plurality of MVD candidates can have a plurality of directions, respectively. In an example, the plurality of MVD candidates is ordered according to the plurality of directions. The TM can be applied to each of the plurality of MVD candidates to obtain a TM cost and a corresponding updated MVD candidate. The MVD can be determined based on the TM costs and the corresponding updated MVD candidates.

In an example, the MVD is determined to be the updated MVD candidate corresponding to the smallest TM cost of the TM costs of the plurality of MVD candidates.

At (S1430), the current block can be encoded based on a motion vector (MV) that is a summation of a motion vector predictor (MVP) and the determined MVD.

At (S1440), prediction information of the current block can be encoded in a bitstream. The prediction information can indicate that the MMVD and the TM mode are applied together to the current block. The prediction information can indicate MVD information of the current block.

In an example, the encoded current block and the encoded prediction information are transmitted in the bitstream.

The process (1400) proceeds to (S1499), and terminates.

The process (1400) can be suitably adapted to various scenarios and steps in the process (1400) can be adjusted accordingly. One or more of the steps in the process (1400) can be adapted, omitted, repeated, and/or combined. Any suitable order can be used to implement the process (1400). Additional step(s) can be added.

In an example, a TM flag is encoded indicating that the TM is enabled for the current block. The encoded bitstream can include the TM flag.

In an embodiment, the plurality of distances is a set of distances described in Tables 1 and 3 or a subset of the set of distances described in Tables 1 and 3. Values of the plurality of distances and values of the set of distances can be based on a search range of the TM. In an example, the search range of the TM is in a range of [−L, +L] in a horizontal direction and in a vertical direction where L is a positive integer. The smallest distance in the plurality of distances is equal to L or L/2. In an example, the plurality of distances is in an arithmetic progression.

In embodiments described in (S1420), the plurality of MVD candidates can have the same direction or the same magnitude. In some examples, the plurality of MVD candidates can have different directions and different magnitudes. The TM can be applied to each of the plurality of MVD candidates to obtain a TM cost and a corresponding updated MVD candidate. The MVD can be determined based on the TM costs and the corresponding updated MVD candidates. In an embodiment, the updated MVD candidates are ranked based on the corresponding TM costs. In an example, the MVD is determined to be the updated MVD candidate corresponding to the smallest TM cost of the TM costs of the plurality of MVD candidates.

As described above, the MVD can be determined based on the TM costs and the corresponding updated MVD candidates. In an example, the plurality of MVD candidates is ranked (e.g., reordered) according to the TM costs of the plurality of MVD candidates. The MVD is determined to be an updated MVD candidate based on a corresponding TM cost. An index (e.g., a distance index or a direction index) can be encoded in the bitstream to indicate the MVD candidate that corresponds to the updated MVD candidate, which is the determined MVD.

Figure 15:
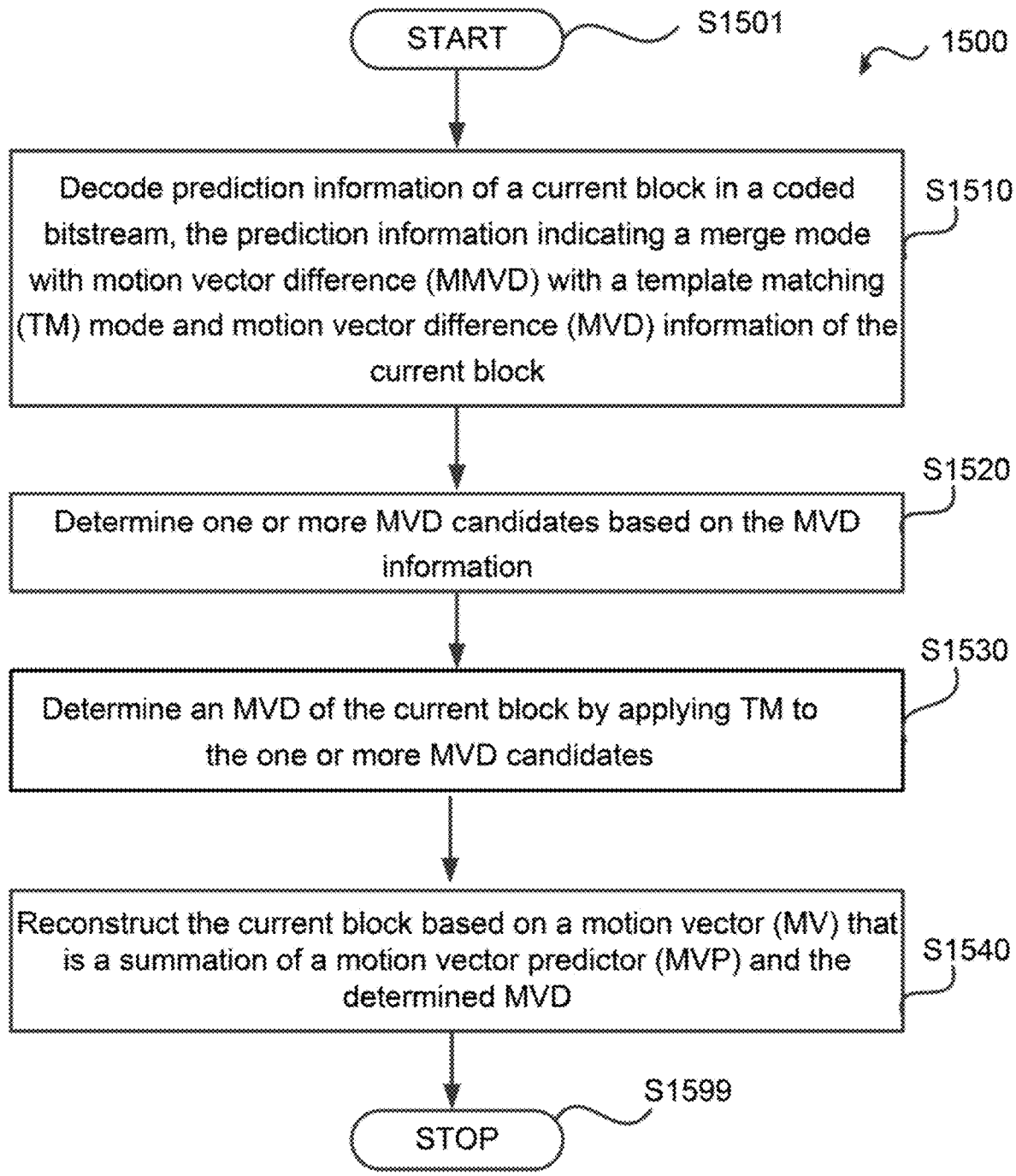
FIG. 15 shows a flow chart outlining an exemplary decoding process.

FIG. 15 shows a flow chart outlining a decoding process (1500) according to an embodiment of the disclosure. In various embodiments, the process (1500) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1500) is implemented in software instructions, thus when the processing circuitry executes the software instructions, the processing circuitry performs the process (1500). The process starts at (S1501), and proceeds to (S1510).

At (S1510), prediction information of a current block in a coded bitstream can be decoded. The prediction information can indicate that a merge mode with motion vector difference (MMVD) with a template matching (TM) mode is applied to the current block. The prediction information can indicate motion vector difference (MVD) information of the current block.

In an example, the coded bitstream further includes a TM flag indicating that the TM is enabled for the current block.

At (S1520), one or more MVD candidates can be determined based on the MVD information.

At (S1530), an MVD (e.g., a TM matched MVD) of the current block can be determined by applying TM to the one or more MVD candidates. In an embodiment, the TM is performed to search for the matched MVD between a current template of the current block and a reference template of a reference block of the current block based on the one or more MVD candidates. In an example, the one or more MVD candidates is an MVD candidate, and the TM is performed to search around the MVD candidate for the matched MVD. In an example, the one or more MVD candidates includes a plurality of MVD candidates, and the TM is performed to search among the plurality of MVD candidates for the matched MVD. In an example, the TM is performed to search around each of the plurality of MVD candidates for the matched MVD.

In an embodiment, the one or more MVD candidates is one MVD candidate. The MVD information includes distance information indicating a magnitude of the one MVD candidate and direction information indicating a direction of the one MVD candidate. The one MVD candidate is determined based on the magnitude of the one MVD candidate and the direction of the one MVD candidate using the MMVD mode. The MVD can be determined by applying the TM to the one MVD candidate, as described in the disclosure. For example, the matched MVD can be determined by performing the TM around the one MVD candidate.

In an embodiment, the one or more MVD candidates include a plurality of MVD candidates that have a same direction. The MVD information includes direction information indicating the direction of the plurality of MVD candidates. The plurality of MVD candidates can be determined based on the direction of the plurality of MVD candidates and a plurality of distances. In an example, the plurality of MVD candidates is ordered based on the plurality of distances. The TM can be applied for each of the plurality of MVD candidates to obtain a TM cost and a respective updated MVD candidate. The matched MVD can be determined based on the TM costs and the corresponding updated MVD candidates.

In an example, the MVD information includes a distance index. The plurality of MVD candidates can be ranked (e.g., reordered) according to the TM costs of the plurality of MVD candidates. The matched MVD can be determined to be the updated MVD candidate corresponding to the MVD candidate indicated by the distance index in the plurality of reordered MVD candidates.

In an example, the distance index is not signaled. The matched MVD is determined to be the updated MVD candidate that corresponds to the smallest TM cost of the TM costs of the plurality of MVD candidates.

In an embodiment, the one or more MVD candidates include a plurality of MVD candidates that have a same magnitude. The MVD information includes distance information indicating the magnitude of the plurality of MVD candidates. The plurality of MVD candidates can be determined based on the magnitude of the plurality of MVD candidates and a plurality of directions. In an example, the plurality of MVD candidates is ordered according to the plurality of directions. The TM can be applied to each of the plurality of MVD candidates to obtain a TM cost and a corresponding updated MVD candidate. The matched MVD can be determined based on the TM costs and the corresponding updated MVD candidates.

In an example, the MVD information includes a direction index. The plurality of MVD candidates can be reordered according to the TM costs of the plurality of MVD candidates. The matched MVD can be determined to be the updated MVD candidate corresponding to the MVD candidate indicated by the direction index in the plurality of reordered MVD candidates.

In an example, the direction index is not signaled. The matched MVD is determined to be the updated MVD candidate corresponding to the smallest TM cost of the TM costs of the plurality of MVD candidates.

Alternatively, when the one or more MVD candidates include the plurality of MVD candidates, the TM can be applied to the plurality of MVD candidates to obtain respective TM costs. For example, the TM is performed among the plurality of MVD candidates. The matched MVD can be determined based on the TM costs and the corresponding MVD candidates. In an example, the matched MVD is determined to be the MVD candidate indicated by the distance index in the plurality of reordered MVD candidates. In an example, the distance index is not signaled, and the matched MVD is determined to be the MVD candidate that corresponds to the smallest TM cost of the TM costs of the plurality of MVD candidates.

At (S1540), the current block can be reconstructed based on a motion vector (MV) that is a summation of a motion vector predictor (MVP) and the determined MVD (e.g., the matched MVD).

The process (1500) proceeds to (S1599), and terminates.

The process (1500) can be suitably adapted to various scenarios and steps in the process (1500) can be adjusted accordingly. One or more of the steps in the process (1500) can be adapted, omitted, repeated, and/or combined. Any suitable order can be used to implement the process (1500). Additional step(s) can be added.

In an embodiment, the distance information includes a distance index pointing to a distance in a plurality of distances. For example, the plurality of distances is a set of distances described in Tables 1 and 3 or a subset of the set of distances described in Tables 1 and 3. The distance is the magnitude of the one MVD candidate. Values of the plurality of distances can be based on a search range of the TM. In an example, the search range of the TM is in a range of [−L, +L] in a horizontal direction and in a vertical direction where L is a positive integer. The smallest distance in the plurality of distances is equal to L or L/2. In an example, the plurality of distances is in an arithmetic progression.

In embodiments described in (S1530), the plurality of MVD candidates can have the same direction or the same magnitude. In some examples, the plurality of MVD candidates can have different directions and different magnitudes. In an example, the plurality of MVD candidates is determined using the MMVD mode, for example, based on the MVD information. The TM can be applied to each of the plurality of MVD candidates to obtain a TM cost and a corresponding updated MVD candidate. The matched MVD can be determined based on the TM costs and the corresponding updated MVD candidates. In an embodiment, the updated MVD candidates are ranked based on the corresponding TM costs. In an example, an index is signaled, and the matched MVD is determined to be the updated MVD candidate corresponding to the MVD candidate indicated by the index in the plurality of ranked (e.g., reordered) MVD candidates. In an example, the matched MVD is determined to be the updated MVD candidate corresponding to the smallest TM cost of the TM costs of the plurality of MVD candidates.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
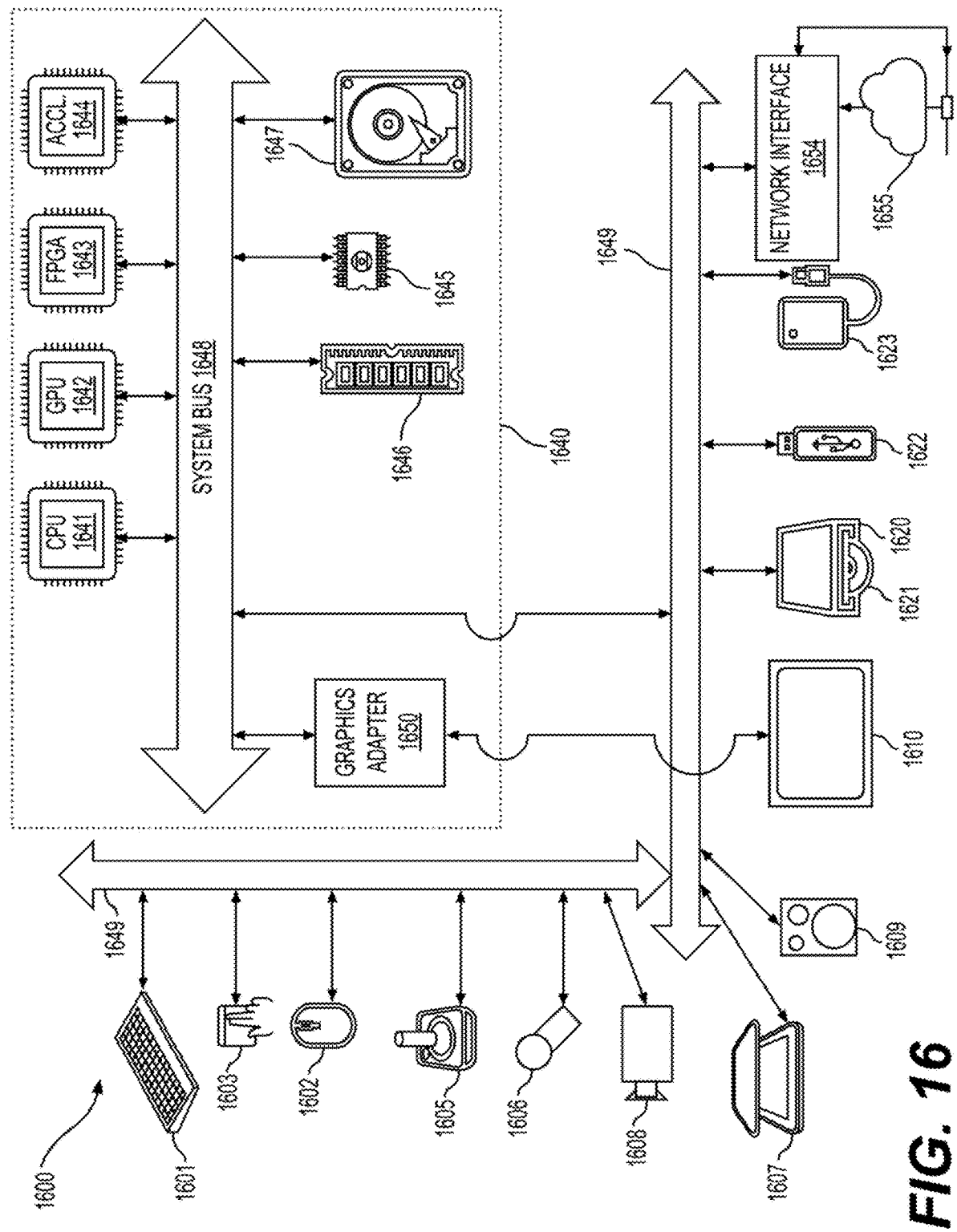
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch-screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
    decoding prediction information of a current block in a coded bitstream, the prediction information indicating that template matching (TM) is applied with a merge mode with motion vector difference (MMVD) mode and indicating motion vector difference (MVD) information of the current block;
    determining, using the MMVD mode, one or more MVD candidates based on the MVD information and a first plurality of distances;
    performing TM to search for a matched MVD between a current template of the current block and a reference template of a reference block of the current block based on the one or more MVD candidates determined using the MMVD mode; and
    reconstructing the current block based on a motion vector (MV) that is a summation of a motion vector predictor (MVP) and the matched MVD, wherein
    the first plurality of distances used in the MMVD mode to determine the one or more MVD candidates when the TM is enabled is different from a second plurality of distances used in the MMVD mode when the TM is not enabled.

2. The method of claim 1, wherein
    the one or more MVD candidates is one MVD candidate;
    the MVD information includes distance information indicating a magnitude of the one MVD candidate that is one of the first plurality of distances and direction information indicating a direction of the one MVD candidate;
    the determining the one or more MVD candidates includes determining the one MVD candidate based on the magnitude of the one MVD candidate and the direction of the one MVD candidate; and
    the performing the TM includes performing the TM around the one MVD candidate.

3. The method of claim 2, wherein
    the coded bitstream further includes a TM flag, and
    the TM flag indicates that the TM is enabled for the current block.

4. The method of claim 3, wherein
    the distance information includes a distance index pointing to a distance in the first plurality of distances, the distance being the magnitude of the one MVD candidate; and
    the first plurality of distances is based on a search range of the TM.

5. The method of claim 4, wherein
    the search range of the TM is in a range of [−L, +L] in a horizontal direction and in a vertical direction, L being a positive integer; and
    the smallest distance in the first plurality of distances is equal to L or L/2.

6. The method of claim 3, wherein
    the distance information includes a distance index pointing to a distance in the first plurality of distances, the distance being the magnitude of the one MVD candidate; and
    the first plurality of distances is in an arithmetic progression.

7. The method of claim 1, wherein
    the one or more MVD candidates include a plurality of MVD candidates that have a same direction;
    the MVD information includes direction information indicating the direction of the plurality of MVD candidates;
    the determining the one or more MVD candidates includes determining the plurality of MVD candidates based on the direction of the plurality of MVD candidates and the first plurality of distances, the plurality of MVD candidates being ordered based on the first plurality of distances; and
    the performing the TM includes:
        applying, for each of the plurality of MVD candidates, the TM to the respective MVD candidate to obtain a TM cost and a corresponding updated MVD candidate corresponding to the respective MVD candidate; and
        determining the matched MVD based on the TM costs and the corresponding updated MVD candidates.

8. The method of claim 7, wherein
    the MVD information includes a distance index; and
    the performing the TM includes:
        reordering the plurality of MVD candidates according to the TM costs of the plurality of MVD candidates; and
        determining the matched MVD to be the updated MVD candidate corresponding to the MVD candidate indicated by the distance index in the plurality of reordered MVD candidates.

9. The method of claim 7, wherein the performing the TM comprises:
    determining the matched MVD to be the updated MVD candidate that corresponds to the smallest TM cost of the TM costs of the plurality of MVD candidates.

10. The method of claim 1, wherein
    the one or more MVD candidates include a plurality of MVD candidates that have a same magnitude;
    the MVD information includes distance information indicating that the magnitude of the plurality of MVD candidates is one of the first plurality of distances;

the determining the one or more MVD candidates includes determining the plurality of MVD candidates based on the magnitude of the plurality of MVD candidates and a plurality of directions, the plurality of MVD candidates being ordered according to the plurality of directions; and the performing the TM includes:
applying, for each of the plurality of MVD candidates, the TM to the respective MVD candidate to obtain a TM cost and a corresponding updated MVD candidate corresponding to the respective MVD candidate; and determining the matched MVD based on the TM costs and the corresponding updated MVD candidates.

11. The method of claim 10, wherein
the MVD information includes a direction index; and
the performing the TM includes:
reordering the plurality of MVD candidates according to the TM costs of the plurality of MVD candidates; and determining the matched MVD to be the updated MVD candidate corresponding to the MVD candidate indicated by the direction index in the plurality of reordered MVD candidates.

12. The method of claim 10, wherein the performing the TM comprises:
determining the matched MVD to be the updated MVD candidate corresponding to the smallest TM cost of the TM costs of the plurality of MVD candidates.

13. A method for video encoding in a video encoder, comprising:
determining, using a merge mode with motion vector difference (MMVD) mode, one or more motion vector difference (MVD) candidates of a current block based on a first plurality of distances when template matching (TM) is to be applied with the MMVD mode to encode the current block;

performing TM to search for a matched MVD between a current template of the current block and a reference template of a reference block of the current block based on the one or more MVD candidates determined using the MMVD mode; and encoding the current block in a coded bitstream based on a motion vector (MV) that is a summation of a motion vector predictor (MVP) and the matched MVD, wherein the first plurality of distances used in the MMVD mode to determine the one or more MVD candidates when the TM is enabled is different from a second plurality of distances used in the MMVD mode when the TM is not enabled.

14. The method of claim 13, wherein
the one or more MVD candidates is one MVD candidate;
the determining the one or more MVD candidates includes determining the one MVD candidate based on a magnitude of the one MVD candidate that is one of the first plurality of distances and a direction of the one MVD candidate; and the performing the TM includes performing the TM around the one MVD candidate.

15. The method of claim 14, wherein
the coded bitstream further includes a TM flag, and
the TM flag indicates that the TM is enabled for the current block.

16. The method of claim 15, wherein
the coded bitstream includes distance information, the distance information including a distance index pointing to a distance in the first plurality of distances, the distance being the magnitude of the one MVD candidate; and the first plurality of distances is based on a search range of the TM.

17. The method of claim 16, wherein
the search range of the TM is in a range of [−L, +L] in a horizontal direction and in a vertical direction, L being a positive integer; and the smallest distance in the first plurality of distances is equal to L or L/2.

18. The method of claim 15, wherein
the coded bitstream includes distance information, the distance information including a distance index pointing to a distance in the first plurality of distances, the distance being the magnitude of the one MVD candidate; and the first plurality of distances is in an arithmetic progression.

19. The method of claim 13, wherein
the one or more MVD candidates include a plurality of MVD candidates that have a same direction;
the determining the one or more MVD candidates includes determining the plurality of MVD candidates based on the direction of the plurality of MVD candidates and the first plurality of distances, the plurality of MVD candidates being ordered based on the first plurality of distances; and the performing the TM includes:
applying, for each of the plurality of MVD candidates, the TM to the respective MVD candidate to obtain a TM cost and a corresponding updated MVD candidate corresponding to the respective MVD candidate; and determining the matched MVD based on the TM costs and the corresponding updated MVD candidates.

20. A method of processing visual media data, the method comprising:
performing a conversion between a visual media file and a bitstream of visual media data according to a format rule, wherein the bitstream includes prediction information of a current block, the prediction information indicating that template matching (TM) is applied with a merge mode with motion vector difference (MMVD) and motion vector difference (MVD) information of the current block; and the format rule specifies that:
one or more MVD candidates are determined using the MMVD mode based on the MVD information and a first plurality of distances, TM is performed to search for a matched MVD between a current template of the current block and a reference template of a reference block of the current block based on the one or more MVD candidates determined using the MMVD mode, the current block is reconstructed based on a motion vector (MV) that is a summation of a motion vector predictor (MVP) and the matched MVD, and the first plurality of distances used in the MMVD mode to determine the one or more MVD candidates when the TM is enabled is different from a second plurality of distances used in the MMVD mode when the TM is not enabled.

* * * * *